United States Patent Office 2,986,583
Patented May 30, 1961

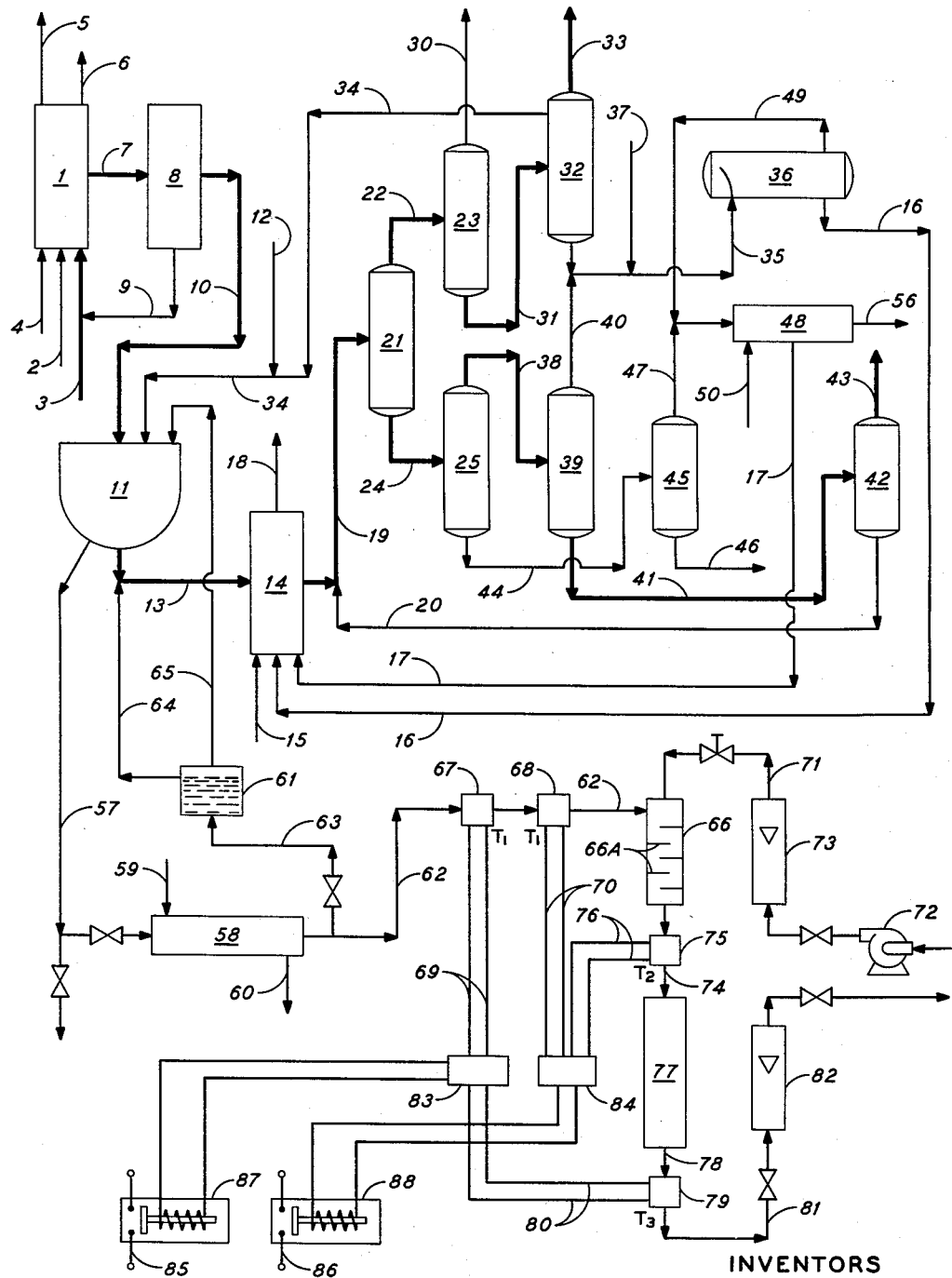

2,986,583
PROCESSES FOR SEPARATING HYDROPEROXIDES INTO PHENOL AND OTHER PRODUCTS
James A. Robbers, San Pablo, and John R. B. Ellis, San Rafael, Calif., assignors to California Research Corporation, San Francisco, Calif., a corporation of Delaware
Filed Mar. 30, 1956, Ser. No. 575,168
9 Claims. (Cl. 260—621)

This invention relates to $\alpha,\alpha$-dialkylarylmethyl hydroperoxides, for example, $\alpha,\alpha$-dimethylbenzyl hydroperoxide (cumene hydroperoxide, hereinafter referred to as "CHP"), and more particularly to improvements in processes for conversion of said hydroperoxides by cleavage in a cleavage zone into other products including phenol; and an object of the invention is to provide novel methods for determining the concentration of said hydroperoxides in said cleavage zone.

Of the various processes for producing phenols synthetically, one that has been found to be particularly useful comprises cleaving $\alpha,\alpha$-aryl dialkylmethyl hydroperoxides by reaction with acid in a cleavage zone to produce phenols and ketones. The process involves a very large exothermic heat of reaction in the cleavage zone, which under normal operating conditions may be carried away by suitable heat exchange media, for example, an overhead condensing system through which acetone is refluxed from the cleavage zone. The process operating conditions are adjusted so that in normal operation the rate of reaction in the cleavage zone is sufficiently rapid to maintain the hydroperoxide concentration in the cleavage zone at a very low level, for example, 0.1 weight percent, and so that the rate of production of heat of reaction does not exceed the rate that can be handled continuously by the heat exchange media.

Heretofore, a very great potential danger of runaway heats of reaction in the cleavage zone due to various changes in operating conditions has made dangerous the operation of processes for cleaving hydroperoxides into other products, including phenol. In such a process, the rate of heat release from the cleavage zone reaction, under normal conditions with a low hydroperoxide concentration, is governed by the rate at which the hydroperoxide is being added to the cleavage zone. However, various operating condition changes may cause the cleavage zone hydroperoxide concentration to rise to the point where the rate of heat release no longer is governed by the rate at which the hydroperoxide is being added, but is governed by other, largely uncontrollable, factors. Any change in the operating conditions which tends to effect a hydroperoxide concentration build-up in the cleavage zone creates a potential hazard which can become dangerous if the operating conditions are corrected after an appreciable rise in the hydroperoxide concentration. Among the various operating conditions that may change to cause the cleavage zone hydroperoxide concentration to rise are: (1) decreased acid flow to the cleavage zone, which may be caused by pump failure and by leaks and stoppages in acid lines; (2) increased water flow rate to the cleavage zone, which may be caused by changes in water content of recycle acetone, cooling water leaks from heat exchangers, and water brought in with the concentrated hydroperoxide; (3) neutralization of acid in the cleavage zone, which may be caused by increased carbonate carry-over from oxidate washers and by backflows into the cleavage zone. Under normal operating conditions the reaction in the cleavage zone is carried out in the presence of sufficiently small amounts of water (which decelerates the rate of reaction) and sufficient large amounts of acid (which accelerates the rate of reaction) to make the hydroperoxide decomposition fairly complete. Under such conditions the usual heat exchange media have sufficient capacity for carrying away the hydroperoxide heat of decomposition and the acid heat of solution. However, rises in the concentration of hydroperoxide in the cleavage zone caused by any of the above-discussed changes in operating conditions, for example, failure of acid flow to the cleavage zone for a time, will result in the reaction of above-normal quantities of hydroperoxide when the normal operating conditions, for example, resumption of normal acid flow, are restored. In such case, if the heat exchange media does not have the capacity to continuously carry off the abnormal heat of hydroperoxide decomposition and heat of acid solution, the temperature rise in the cleavage zone will cause the reaction to speed up, thus producing heat at a greater rate, and so on in a cumulative or cascading fashion. The temperatures and pressures in the cleavage zone thus very quickly become uncontrollable, because of the extreme speed of the reaction and the enormous amounts of heat involved. The potential hazard to personnel and equipment from such runaway temperatures is apparent.

In view of the foregoing, it is an object of this invention to provide methods for detecting a dangerous build-up of hydroperoxide concentration in a cleavage zone in time for steps to be taken to stop the build-up before it gets out of hand. It is a further object of this invention to provide methods for stopping such a dangerous build-up automatically in order to accomplish the desired results, quickly and without reliance on the human element.

In accordance with the present invention, novel methods are provided for detecting a potentially dangerous build-up of hydroperoxide in the cleavage zone in a process for cleaving hydroperoxide into other products, including phenol, comprising passing a bleed stream of cleavage zone mixture from said cleavage zone through cooling means to reduce the mixture temperature below the boiling point thereof, adding acid to said cooled mixture to cleave residual hydroperoxide therein, and measuring the temperature rise of the resulting mixture caused by the hydroperoxide heat of decomposition, as a measure of the hydroperoxide concentration in said bleed stream.

The novel features of the present invention are set forth with particularity in the appended claims. The invention will best be understood, however, and additional objects and advantages thereof will be apparent from the following description of a specific embodiment thereof in an exemplary process for cleaving CHP into phenol and acetone, when read in connection with the accompanying drawing, in which said exemplary process and said specific embodiment are diagrammatically illustrated.

Referring now to the drawing, there is shown a diagrammatic view, including flow paths, of an embodiment of the invention, and of an exemplary CHP cleavage system, in connection with which the invention embodiment shown will be described. The heavier lines indicate generally main direct (i.e., not recycle) flow paths, and particularly main direct flow paths from the main starting material, cumene (line 3) to the main products, phenol (line 43) and acetone (line 33).

In the exemplary CHP cleavage system shown, air and cumene are introduced into oxidizer 1 through lines 2 and 3, respectively. The air supplies the oxygen for the following reaction in oxidizer 1:

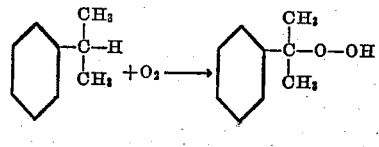

$Na_2CO_3$ is added to oxidizer 1 through line 4 to prevent CHP decomposition in oxidizer 1. Spent air and spent $Na_2CO_3$ are removed through lines 5 and 6, respectively. From oxidizer 1 the CHP passes through line 7 to concentration zone 8, from which cumene is recycled back to oxidizer 1 through line 9. The liquid effluent from oxidizer 1, which may contain, for example, about 90% CHP, is passed through line 10 to cleavage vessel 11. In cleavage vessel 11 the CHP is decomposed in the presence of an acid, for example 96% $H_2SO_4$, which may be introduced into vessel 11 through line 12. The reaction in cleavage vessel 11 proceeds as follows:

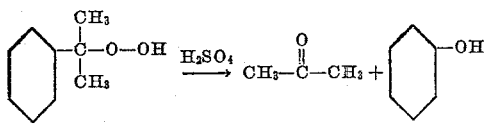

The CHP is substantially completely decomposed under normal operating conditions, by the reaction in cleavage vessel 11. The large exothermic heat of reaction may be removed by refluxing acetone from cleavage vessel 11, for example in an overhead condensing system (not shown). The effluent from cleavage vessel 11 is carried through line 13 to neutralization and water wash zone 14. $Na_2CO_3$ is passed through line 15 into zone 14 to neutralize the acid therein. Wash water enters zone 14 through line 16, from another part of the system, and sodium phenate enters zone 14 through line 17 from another part of the system. Spent water and salts are removed from zone 14 through line 18. The effluent from zone 14 is passed through line 19, together with recycle material entering line 19 through line 20, to crude acetone column 21. From acetone column 21 the overhead product is passed through line 22 to acetaldehyde column 23 and the remaining effluent from column 21 is passed through line 24 to crude phenol column 25. From column 23 a product is taken off through line 30 and the remaining effluent is passed through line 31 to pure acetone column 32. From column 32 product acetone is withdrawn through line 33 and a recycle stream is passed through line 34 to cleavage vessel 11. The remaining effluent from column 32 is passed through line 35 to settler 36, along with fresh makeup water introduced through line 37.

Phenol is passed from crude phenol column 25 through line 38 to phenol topping column 39. From column 39 a product is passed to settler 36 through line 40, and the remaining effluent is passed through line 41 to phenol rerun column 42. From column 42 phenol product is taken off through line 43, and a product is recycled through line 20.

Material passing from column 25 through line 44 enters cracking still 45. From still 45, polymers comprising cumyl phenol are withdrawn through line 46 and the remaining products are passed through line 47 to extraction zone 48. Extraction zone 48 is also supplied through line 49 with the non-water effluent from settling zone 36, and through line 50 with NaOH. From zone 48 sodium phenate is passed through line 17 to neutralization and water wash zone 14, and the remaining product comprising α-methylstyrene, acetophenone and mesityl oxide is withdrawn through line 56.

The above-described process has proven very useful in providing an aromatic ring substitution without sulfonation or chlorination, and in inherently producing substantial quantities of acetone in addition to the phenol yield. However, because of the heretofore very great potential danger of runaway heats of reaction due to possible changes in operating conditions, as previously discussed, the process has been a dangerous one to operate. The following detailed description of the embodiment of this invention that is shown will indicate how the problem has been solved.

Still referring to the drawing, a sample bleed stream is taken from cleavage vessel 11 through line 57 to heat exchanger 58. The bleed stream may be passed through heat exchangers 58 at the rate, for example, of about 3 gallons per minute. Heat exchanger 58 is provided to cool the bleed stream mixture, for example, about 15–20° F. below the normal boiling point of the mixture, which may be about 168–170° F. Those skilled in the art will appreciate that at least sufficient cooling must be accomplished so that the heat liberated as a result of the subsequent acid addition in receptacle 66 will not be more than enough to carry the temperature of the bleed stream-acid mixture to not quite its boiling point, otherwise the sensitivity of the temperature rise as a measure of residual CHP in the bleed stream would be lost. The cooling medium for heat exchanger 58 may be water, which may be introduced into heat exchanger 58 through line 59, and which may be removed through line 60. As the bleed stream mixture leaves heat exchanger 58, it is desirable that means be provided to provide a constant flow rate thereafter for as much of the stream as will be needed for subsequent temperature measurements. This may be accomplished, for example, by providing a vessel 61, in which liquid is maintained at a sufficient level to provide a desired constant head for the mixture flowing in line 62, and by diverting a portion of the exit stream from heat exchanger 58 through line 63 to vessel 61, for example, at the rate of about 2 gallons per minute. From vessel 61 overflow line 64 may be provided for returning the overflow to the main effluent stream from cleavage vessel 11, and pressure equalizing line 65 may be provided to the top of cleavage vessel 11. The residual stream that remains after a portion of the exit stream from heat exchanger 58 has been diverted through line 63 is passed through line 62 at the constant flow rate governed by constant head vessel 61, for example, at abount 1 gallon per minute, to mixing receptacle 66. In line 62 a first temperature $T_1$ is continuously measured by conventional resistance thermometer installations 67 and 68, arranged to provide electrical signals in circuits 69 and 70 proportional to $T_1$. Resistance thermometers are preferable because of the close relationship between the temperature and the electrical resistance of the sensing metals used. The temperature $T_1$ provides a base point for later determinations of temperature rises caused by the heat of solution of acid added to the mixture in mixing receptacle 66, and caused by decomposition of residual hydroperoxide as a result of such acid addition, as now will be described.

The residual stream flowing through line 62 is carried into mixing receptacle 66, where it is mixed with acid, for example, 96% $H_2SO_4$, selected to cleave any residual CHP in the stream. The acid is supplied continuously to mixing receptacle 66 through line 71 by pump 72, with a flow-measuring device, for example, rotometer 73, being provided to indicate the acid flow rate. Baffles 66A may be provided in mixing vessel 66, if desired, to promote more efficient mixing therein. A small mixing vessel 66 comprising a 1-inch diameter pipe fitted with side to side baffles has been found to be quite satisfactory. The temperature $T_2$ of the effluent stream in line 74 from mixing vessel 66 is continuously measured by conventional resistance thermometer installation 75, arranged to provide electrical signals in circuit 76 proportional to $T_2$. It will be seen that the difference between $T_2$ and $T_1$ (herein called $\Delta T_1$) is caused largely by the heat of solution of the acid being added to mixing vessel 66, because the small residence time of the mixture in vessel 66 does not permit appreciable CHP decomposition therein. Therefore, little of the temperature rise in vessel 66 is the result of the release of CHP heat of decomposition. The temperature difference $\Delta T_1$ is used as an indication that acid is flowing to vessel 66, and provides a direct indication of the acid flow rate thereto.

From mixing vessel 66 the mixture passes through line 74 to residence time vessel 77, which is constructed and arranged to provide sufficient residence time in vessel 77 for substantially complete decomposition of residual CHP in the mixture, as a result of the acid addition to vessel 66, to take place. For a flow rate of about 1 gallon per minute through vessel 66, a residence time of about 3 minutes has been found to be satisfactory. The temperature $T_3$ of the effluent stream in line 78 from vessel 77 is continuously measured by conventional resistance thermometer installation 79, arranged to provide electrical signals in circuit 80 proportional to $T_3$. It will be seen that the difference between $T_3$ and $T_1$ (herein called $\Delta T_2$) is the total mixture temperature rise resulting both from the acid heat of solution caused by acid being added to the sample stream and from the CHP heat of decomposition. The effluent from residence vessel 77 is passed through line 81, with the flow being controlled preferably to about 1 gallon per minute, and being measured if desired by a flow-measuring device, for example, rotometer 82.

Instruments 83 and 84 are conventional instruments capable of utilizing the signals in circuits 69 and 80, and in circuits 70 and 76, respectively, to record temperatures and temperature differentials, and to actuate control circuits controlling various process equipment, for example, the acid and CHP pumps supplying cleavage vessel 11. These control circuits may conprise, for example, lines 85 and 86, in which are located relays 87 and 88 actuatable in response to the operation of instruments 83 and 84, respectively. It may now be seen that instrument 83 may be arranged to actuate relay 87 when $\Delta T_2$ exceeds that predetermined value that is selected as indicative of an excessive concentration of CHP in line 62. Relay 87 is preferably arranged to actuate means for stopping the flow of CHP through line 10 into cleavage vessel 11 under such circumstances. Additionally, if desired, relay 87 may be arranged to actuate means for stopping the flow of acid through line 12 into cleavage vessel 11.

It may be seen further that instrument 84 may be arranged to actuate relay 88 when $\Delta T_1$ drops below that predetermined value that is selected as indicative of an adequate acid flow to mixing vessel 66. Relay 88 may be arranged also for stopping the flow of CHP to cleavage vessel 11, if desired. Additionally, if desired, relay 88 may be arranged for stopping the flow of acid to cleavage vessel 11.

It will be appreciated that although $\Delta T_2$ is harnessed to shut down cleavage vessel 11, it is also possible to harness the temperature differential $\Delta T_3$ between $T_2$ and $T_3$. $\Delta T_3$ provides an indication of the heat released in vessel 77 by the CHP decomposition therein. It will be understood that although most of the CHP decomposition takes place in vessel 77, there will be a certain amount of CHP decomposition in vessel 66, depending upon the residence time of the mixture therein. The decomposition of CHP in vessel 66 contributes to $\Delta T_2$, whereas it does not contribute to $\Delta T_3$.

The above-described embodiment of the present invention has been found to be capable of detecting as low as 0.3 weight percent of CHP in the cleavage vessel effluent. Preferably, the system is so arranged and adjusted that it will shut down cleavage vessel 11 before the CHP concentration therein builds up to 1 weight percent. Under normal operating conditions, there may be a CHP concentration in the effluent from cleavage vessel 11 of about 0.5 weight percent.

From the foregoing it may be seen that the present invention operates in a novel and effective manner to prevent a dangerous build-up of hydroperoxide in processes for cleaving hydroperoxides into other products including phenol, by addition of acid to a bleed stream taken from the zone where an increase in hydroperoxide above a predetermined level is not desired, and by harnessing various temperature differentials resulting from heat of solution of the acid so added, and from heat of decomposition of residual hydroperoxide in said bleed stream that is cleaved as the result of such acid addition.

Although only specific arrangements and modes of construction and operation of the present invention have been described and illustrated, numerous changes could be made in those arrangements and modes without departing from the spirit of the invention, and all such changes that fall within the scope of the appended claims are intended to be embraced thereby.

We claim:

1. The method of detecting a potentially dangerous build-up of a hydroperoxide in the cleavage zone in a process for cleaving hydroperoxide into other products including phenol comprising passing a bleed stream of cleavage zone mixture from said cleavage zone into contact with acid to cleave residual hydroperoxide in said stream, maintaining the temperature of said mixture where it contacts said acid sufficiently below the normal boiling point of said mixture so that the temperature of the resulting mixture of said stream and acid will be below the boiling point of said resulting mixture, and measuring the temperature rise of said resulting mixture caused by the hydroperoxide heat of decomposition and the acid heat of solution as a measure of the hydroperoxide concentration in said bleed stream.

2. The method according to claim 1, with the additional step of shutting off hydroperoxide flow to said cleavage zone in response to said temperature rise when said temperature rise reaches a value indicative of the presence of an excess over the maximum tolerable concentration of hydroperoxide.

3. The method according to claim 2, with the additional step of shutting off acid flow to said cleavage zone in response to said temperature rise when said temperature rise reaches said value.

4. The method of preventing a potentially dangerous build-up of hydroperoxide in the cleavage zone in a process for cleaving hydroperoxide into other products including phenol, comprising passing a bleed stream of cleavage zone mixture from said cleavage zone through cooling means to reduce the temperature of said bleed stream sufficiently far below the boiling point temperature thereof so that upon subsequent acid cleavage of residual hydroperoxide in said stream, the resulting mixture will be at a temperature below its boiling point, measuring the temperature of said cooled mixture, adding acid to said cooled mixture, measuring the temperature of said resulting mixture after a first temperature rise substantially caused by liberation of acid heat of solution, measuring the temperature of said resulting mixture after a further temperature rise substantially caused by heat of decomposition of hydroperoxide in said resulting mixture, and stopping the flow of hydroperoxide to said cleavage zone when the total of said first temperature rise and said further temperature rise exceeds a value indicative of the presence of an excess over the maximum tolerable concentration of hydroperoxide.

5. The method according to claim 4, with the additional step of stopping the flow of acid to said cleavage zone when the total of said first temperature rise and said further temperature rise exceeds a value indicative of the presence of an excess over the maximum tolerable concentration of hydroperoxide.

6. The method according to claim 4, with the additional step of stopping the flow of hydroperoxide to said cleavage zone when said first temperature rise falls below a value indicative of an adequate rate of acid addition to said cooled mixture.

7. The method of preventing a potentially dangerous build-up of hydroperoxide in the cleavage zone in a process for cleaving hydroperoxide into other products including phenol, comprising withdrawing a bleed stream of cleavage zone mixture from said cleavage zone, cooling said withdrawn mixture, measuring the temperature of the cooled mixture, adding acid to said cooled mixture to cleave residual hydroperoxide therein, measuring the temperature of the resulting mixture after said acid addition to determine the first temperature rise substantially caused by the acid heat of solution, measuring the temperature of said resulting mixture after said residual hydroperoxide has been permitted to decompose to determine the further temperature rise substantially caused by the hydroperoxide heat of decomposition, and stopping the flow of hydroperoxide to said cleavage zone when said temperature rises indicate that the concentration of said residual hydroperoxide in said bleed stream has reached a value indicative of the presence of an excess over the maximum tolerable concentration of hydroperoxide, said cooling being sufficient so that said temperature of said cooled mixture plus said temperature rises equal a temperature less than the boiling point temperature of said resulting mixture.

8. The method according to claim 7, in which said flow of hydroperoxide to said cleavage zone is stopped automatically in response to said temperature rises when their total exceeds a value indicative of the presence of an excess over the maximum tolerable concentration of hydroperoxide.

9. The method according to claim 7, in which said flow of hydroperoxide to said cleavage zone is stopped automatically in response to said further temperature rise when said further temperature rise exceeds a value indicative of the presence of an excess over the maximum tolerable concentration of hydroperoxide.

References Cited in the file of this patent

UNITED STATES PATENTS

| | | |
|---|---|---|
| 2,154,795 | Westenberg | Apr. 18, 1939 |
| 2,590,436 | Luten | Mar. 25, 1952 |
| 2,626,281 | Joris | Jan. 20, 1953 |
| 2,663,735 | Filar et al. | Dec. 22, 1953 |
| 2,761,877 | Mosnier | Sept. 4, 1956 |